Sept. 22, 1925.
W. J. STRATTON
1,554,466
MECHANICAL BAR CHART AND METHOD OF MAKING SAME
Filed Nov. 22, 1923
2 Sheets-Sheet 1
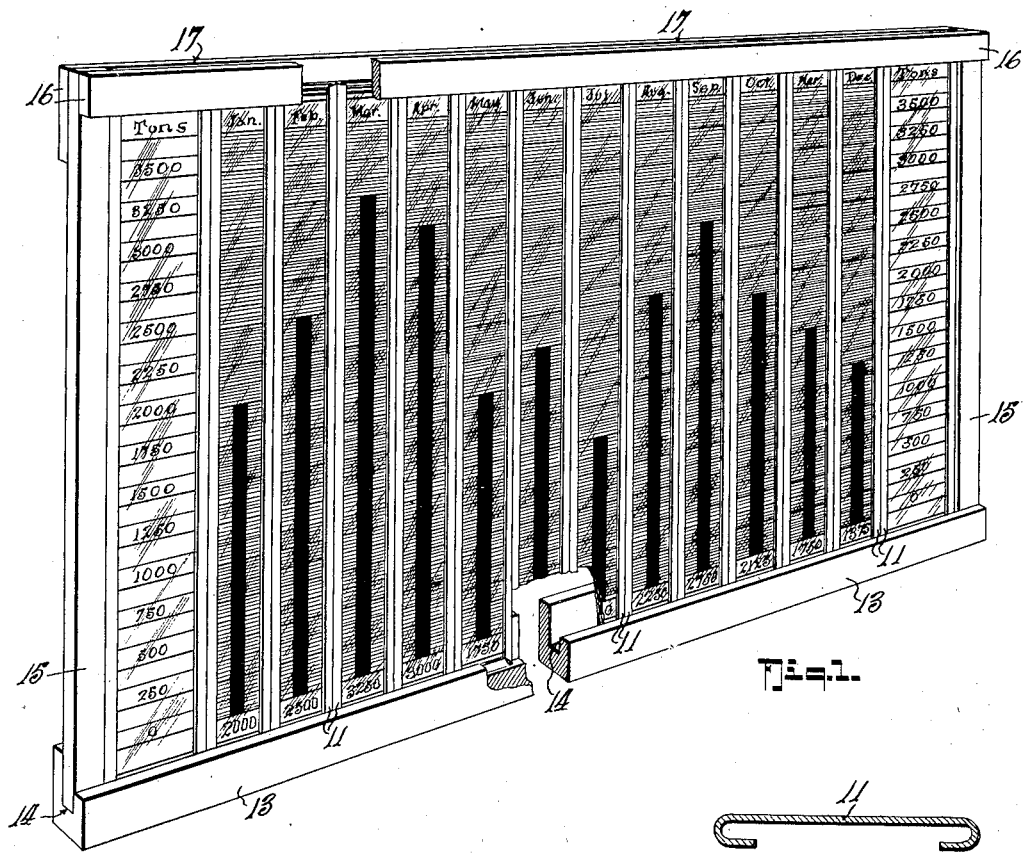
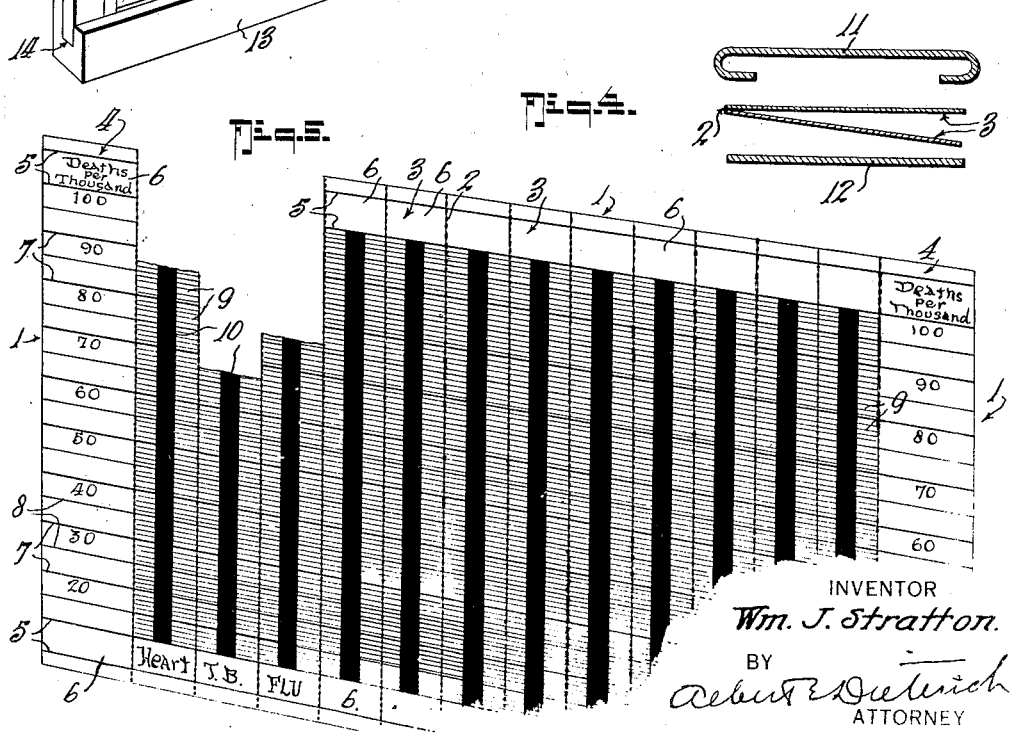
INVENTOR
Wm. J. Stratton.
BY
ATTORNEY Sept. 22, 1925.                                                    1,554,466
                           W. J. STRATTON
            MECHANICAL BAR CHART AND METHOD OF MAKING SAME
                    Filed Nov. 22, 1923        2 Sheets-Sheet 2
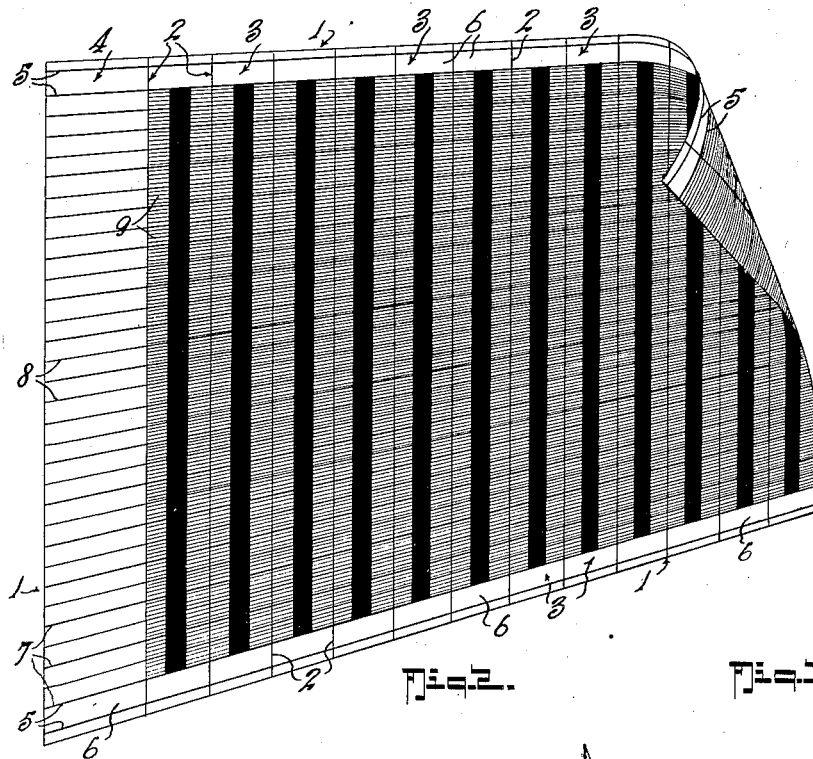
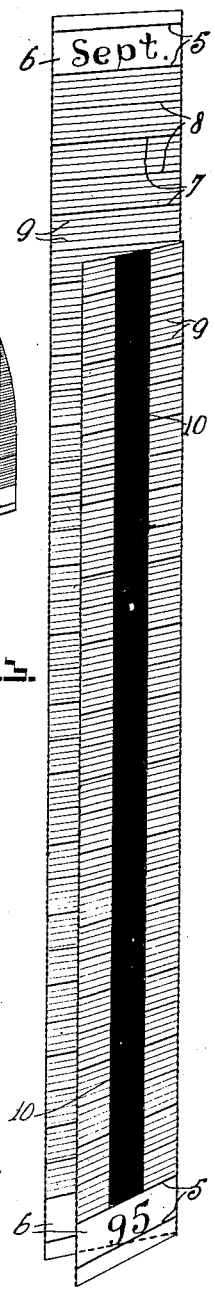
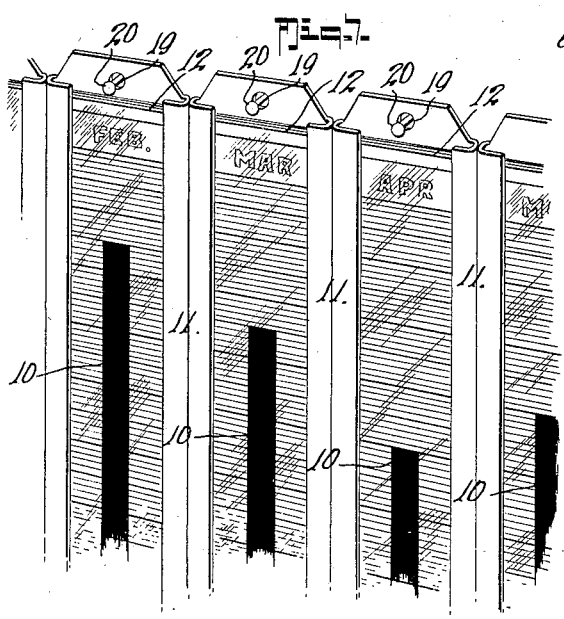
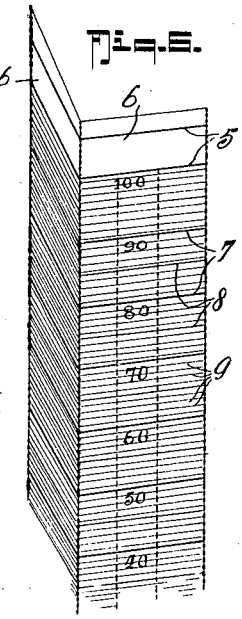
INVENTOR
*Wm. J. Stratton.*
BY
ATTORNEY Patented Sept. 22, 1925.

1,554,466

UNITED STATES PATENT OFFICE.

WILLIAM J. STRATTON, OF WALLACE, IDAHO.

MECHANICAL BAR CHART AND METHOD OF MAKING SAME.

Application filed November 22, 1923. Serial No. 676,450.

*To all whom it may concern:*

Be it known that I, WILLIAM J. STRATTON, a citizen of the United States, residing at Wallace, in the county of Shoshone and State of Idaho, have invented a new and useful Mechanical Bar Chart and Method of Making Same, of which the following is a specification.

The invention relates to the art of preparing exhibits in graphic chart form and generally resides in the provision of a mechanical bar chart for that purpose.

In the art of preparing such exhibits many different forms of charts are used and whereupon the fluctuations of value, quantity of production, or other desired statistics are graphically exhibited by curves, circles, point to point lines, bars or otherwise according to the knowledge and whims of the individual whose duty it is to prepare such charts.

The most simple form of such chart, for ordinary business purposes, is the common bar chart wherein the fluctuation is graphically illustrated by value or quantity indicating lines drawn to the length desired to indicate the particular value or amount. With this form of chart the present invention is concerned.

In preparing the common type of exhibit in graphic chart form, a scale is arrived at that will take in the minimum and maximum of the values or quantities to be depicted by the exhibit, lines are then ruled to fit such scale, and, in case of the bar type of chart, the bars are then drawn to the lengths necessary to indicate the desired value or quantity. This is very slow and tedious work and must be done with great care, or the exhibit will not only be incorrect but will look very unattractive. Obviously such work cannot be done with the necessary degree of accuracy or neatness unless the party is skilled as a draftsman, thus making the preparations of such exhibits an expensive system, due to the time consumed and the duplication of employees made necessary by the present methods of preparing such charts.

Therefore, it is the object of this invention to provide a mechanical bar chart which is capable of being used and of being prepared for use as a graphic exhibit of quantities or values without the necessity of any lines whatever being drawn by the individual or individuals preparing or compiling the said chart.

It is a further object of the invention to provide a chart of the character stated which is so simple of construction and of operation that it may be used by anyone, whether he has skill as a draftsman or not, thus eliminating the necessity of employing high priced employees and making it possible for the party having charge of collecting and recording such data to prepare the charts himself with the result of time saving and also the elimination of many possibilities of error.

With the above and other objects in view that will hereinafter appear, the invention further resides in those novel details of construction, combination and arrangement of parts, all of which will be first fully described, then be particularly pointed out in the appended claims, reference being had to the accompanying drawings, in which:

Figure 1 is a perspective view of the invention in use, parts being broken away and in section.

Figure 2 is a perspective view of the printed sheet from which the exhibit bar strips are formed.

Figure 3 is a detail perspective view of a single exhibit bar strip torn from the master sheet and prepared for use.

Figure 4 is a horizontal section of one of the strip guides and the exhibit bar strip and transparent facing strip, the parts being shown as separated.

Figure 5 is a perspective view of a modified form of the invention.

Figure 6 is a perspective view of a portion of a slightly modified form of bar strip.

Figure 7 is a perspective view showing a further slight modification of the invention.

In the drawings in which like numerals of reference indicate like parts in all of the figures, 1 represents the master sheet from which is formed the plurality of individual bar strips in a manner hereinafter described in detail.

The master sheet, see Figure 2, is divided into a plurality of vertical columns by the print-lines 2, the columns formed thereby being designated 3, and a single wide margin 4, the purpose of which will presently appear.

Horizontal lines 5 are printed adjacent the top and bottom of the sheet and in cooperation with the vertical lines 2, form individual blank spaces 6 in which values, months or other data may be affixed for the purpose later to be described.

The space between the upper and lower space portions 6 is divided into a plurality of horizontal divisions by the lines 7, and these divisions are each subdivided into like sized divisions by the lines 8. In practice, the main lines 7 and the supplemental lines 8 are preferably printed in distinctive colors as, for example, blue and red respectively. This will serve to increase the ease of accurate observation.

All of the spaces formed by the lines 7 and 8 in the columns 3, but not in the margin, are again subdivided into a like number of subdivisions by the horizontal lines 9 to adapted the same for very accurate and minute exhibitions.

Each column 3 is provided with a heavy black indicating bar 10 printed thereupon and extending vertically thereof the whole length of said column between the upper and lower space portions 6, the purpose for which will presently appear.

In the use of bar charts it is now the common practice to have a draftsman rule up a sheet suitable to the needs of the particular exhibit and designed to take in the maximum and minimum of fluctuation. Then, after being given the detailed data by the statistician or person in charge of the collection of such data, he proceeds to letter his sheet properly and draw the bars necessary to indicate the fluctuations. It is obvious that by this method it is necessary to employ several individuals to collect, prepare the data and to draw up the finished exhibit making the system very costly and dependent for neatness and accuracy upon separate operations of individuals and the skill of a draftsman.

In the use of my invention it is wholly unnecessary to draw any lines whatever, thus eliminating the necessity of employing a draftsman, and the manner of using the same so simple and quickly effected that the completed exhibit may be prepared at once by any single individual capable of handling the data therefor.

In the preferred embodiment of my invention the master sheet illustrated in Figure 2 is used. This sheet is printed and perforated at 2 to provide a single margin and twelve columns, each such column being printed with a heavy black bar thereupon on one face thereof, and in use two of such columns are torn off to be used together as a single strip unit. Thus there are six strip units and one margin to each sheet. These strip units are used in cooperation with each other and with suitable framing or holding devices to provide a bar chart exhibit, such as is illustrated in Figure 1, in which the fluctuation of the coal production of a mine is graphically illustrated in thousands of tons and from month to month over a period of one year.

It will be observed that my invention, while adaptable to all uses to which any bar chart is susceptible, is particularly adaptable to use for twelve month or twelve unit exhibits. This is due only to the particular dimension of master sheet shown which, however, may be varied at will. The sheet shown contains twelve columns and a single margin. Two columns being desirable to compose a single strip unit, two sheets therefore provide twelve strip units and two margins one right and one left, as shown in Figure 1.

For supporting and holding the exhibit, I desire to use a metal strip guide 11, such as illustrated in Figures 1 and 4 and which is bent from thin sheet metal to form an open faced slide into which each strip unit may be inserted after which a transparent facing strip 12 of celluloid or other suitable material may be inserted for protecting the column and through which the same may be viewed.

In the illustration in Figure 1, each holder strip 11 carries the exhibit of one month's production and one at each end thereof carries a margin exhibit of the maximum to minimum scale.

For suitably supporting these holders in proper cooperative relation for easy reading, I provide a base bar 13 preferably of wood, and which is suitably grooved as at 14 to form a bottom rest for the bottom ends of all of the holders 11 and whereby each exhibit strip is held in position for having its horizontal lines in perfect alignment with those of all the remaining strips. End bars 15 are provided and secured in upright relation with the base bar to the ends of which they are secured. These bars 15 support, at their upper ends, a pair of front and back support bars 16 in position for holding the upper ends of the strips 11 from displacement and for leaving a suitable space 17 therebetween for the insertion of the several strips 11.

Let us suppose that it is desired to prepare the exhibit illustrated in Figure 1. The operator arrives at a suitable scale within which the maximum and minimum of coal production for the year will lie. He then marks upon each margin the scale which here appears from 0 to 3500 divided in units of 250 tons. For this scale it will be observed that each of the major divisions bounded by the lines 7 represent 250 ton divisions. The divisions made by lines 8 represent 125 ton divisions, and those made by the lines 9 represent 25 ton divisions.

The operator in preparing the exhibit tears off a two column strip unit as illustrated in Figure 3, and folds the same upon itself along the dividing perforations and with the bar printed side outward and the back sides, ruled exactly as are the front sides except for the bars, opposing each other. The bar at the front side is then folded over, creased and torn off to leave the indicating bar 10 of the proper length to indicate the proper number of tons for the particular month, which month he may fill in at the top space 6 on the back side of the opposing column as indicated. The lines of this opposing back column serves as a continuation of the front strip and gives the exhibit the appearance of one upon which the bar 10 has been hand drawn. The number of tons may be placed below, as indicated, but this is unnecessary because a mere glance across the chart to either scale will reveal the number of tons indicated.

The strip and a transparent facing 12 are then inserted into the holder 11 and inserted in its proper position in the supporting frame. This method is repeated until the exhibit is complete as in Figure 1.

While it is preferred that my master sheet be merely used to produce the two column strip units for use in combination with the holder devices, it is obvious that this sheet is adaptable to use as an exhibit in itself, see Figure 5. That figure shows an exhibit in the course of preparation which is made by simply tearing off a part of each column to make each bar 10 of the proper indicative length. The sheet may be used in cooperation with the back of a like sheet to fill out the back spaces and to supply the cross lines, without such backing entirely in which case the lines of adjacent columns will act as cross line indications, or with a plain sheet backing as may be desired. In this use of the sheet the bottom space portions 6 may be used for indicating data, as shown in the figure.

It should be understood that in cases of large concerns where much use of these charts is made, the scales and the standard markings may be printed thereon originally and all that is necessary then to complete the chart is the tearing of the bars to proper length. In this case the month markings or the equivalent thereof will be printed in the proper alternate ones of the space portions 6 at the top of the rear face of the sheet.

As an aid to the tearing of the bar 10, the alternate back columns may be printed with indicating numerals to facilitate accurate tearing of said strips, see Figure 6.

By reference to Figure 7 it will be observed that the strips 11 may be used in cooperation without the aid of a holding frame by merely providing them with apertures 19 for cooperating with supporting nails 20 fixed to the wall in proper horizontal alignment.

While the indicating bars have been herein referred to as printed black it is obvious that these bars and the remainder of the chart may be printed in various color combinations without departing from the scope of the invention as set forth in the appended claims.

From the foregoing description, taken in connection with the drawings by which it is accompanied, it is thought that the construction, manner of use, and the advantages of my invention will be readily apparent to those skilled in the art to which it relates.

What I claim is:

1. In a bar chart, a strip unit composed of two columns having horizontal divisions at like points on the front and back faces thereof and each having an indicating bar on the front face thereof extending lengthwise of said columns, the said columns being adapted to be folded lengthwise back to back and one of said columns torn off to regulate the length of the indicator bar thereof.

2. In a bar chart, a strip unit composed of two columns, horizontal value indicating divisions located thereon at like points on the front and back faces thereof, having a blank space at the top and bottom of both faces of each column and each said column having located on the front faces thereof an indicating bar extending lengthwise of the columns from top space to bottom space, the said columns being adapted to be folded lengthwise back to back and one of said columns torn off to regulate the length of the indicating bar thereof.

3. In a bar chart, a strip unit composed of two columns having horizontal divisions at like points on the front and back faces thereof, and each having an indicating bar on the front face thereof extending lengthwise of said columns, the said columns being adapted to be folded lengthwise back to back and one of said columns torn off to regulate the length of the indicator bar thereof, and a marginal strip cooperative with said strip unit and having thereon horizontal divisions corresponding to at least some of the horizontal divisions on said strip units.

4. In a bar chart, a strip unit composed of two columns, horizontal value indicating divisions located thereon at like points on the front and back faces thereof, having a blank space at the top and bottom of both faces of each column and each said column having located on the front faces thereof an indicating bar extending lengthwise of the columns from top space to bottom space, the said columns being adapted to be folded lengthwise back to back and one of said columns torn off to regulate the length of the indicator bar thereof, and a marginal strip cooperating with said strip unit and having printed thereon horizontal value indicating divisions corresponding to at least some of the horizontal divisions on said strip units and adapted to have a scale applied thereupon for coacting with the said divisons of the strip unit for exhibiting the value designated by the bar on the torn position of said strip unit.

5. In a bar chart, the combination with a strip unit composed of two columns having horizontal divisions at like points on the front and back faces thereof, and each having an indicating bar on the front face thereof extending lengthwise of said column, the said columns being adapted to be folded lengthwise back to back and one of said columns torn off to regulate the length of the indicator bar thereof, of a holder for said strip unit comprising a body portion, and means for holding said strip unit to said body portion in a manner for being viewed through the front thereof.

6. In a bar chart, the combination with a strip unit composed of two columns having horizontal divisions at like points on the front and back faces thereof, and each having an indicating bar on the front face thereof, extending lengthwise of said columns, the said columns being adapted to be folded lengthwise back to back and one of said columns torn off to regulate the length of the indicator bar thereof, of a holder for said strip unit comprising an open ended open faced slide adapted to receive said strip unit in a manner whereby to exhibit the front face thereof, and a transparent strip insertable into said holder for protecting the exhibiting face of said strip.

7. In a bar chart, a strip unit composed of two columns having horizontal divisions at like points on the front and back faces thereof and each having an indicating bar on the front face thereof extending lengthwise of said columns, the said columns being adapted to be folded lengthwise back to back and one of said columns torn off to regulate the length of the indicator bar thereof, the said strip unit having applied thereupon a scale for indicating the place at which the portion of said unit is to be torn.

8. In a bar chart, the combination with a strip unit composed of two columns having horizontal divisions at like points on the front and back faces thereof, each having an indicating bar on the front face thereof extending lengthwise of said columns, the said columns being adapted to be folded lengthwise back to back and one of said columns torn off to regulate the length of the indicator bar thereof, of a holder for said strip unit, an open ended open faced slide adapted to receive said strip unit in a manner whereby to exhibit the front face thereof, a transparent strip insertable into said holder for protecting the exhibiting face of said strip, each said holder having an end extension having an aperture therethrough.

9. In a bar chart, the combination with a strip unit composed of two columns having horizontal divisions at like point on the front and back faces thereof, and each having an indicating bar on the front face thereof extending lengthwise of said columns, the said columns being adapted to be folded lengthwise back to back and one of said columns torn off to regulate the length of the indicator bar thereof, the said strip unit having applied thereupon a scale for indicating the place at which the portion of said unit is to be torn, of a holder for said strip unit, an open ended open faced slide adapted to receive said strip unit in a manner whereby to exhibit the front face thereof, a transparent strip insertable into said holder for protecting the exhibiting face of said strip, each said holder having an end extension having an aperture therethrough.

10. In a bar chart, the combination with a strip unit composed of two columns having horizontal divisions at like points on the front and back faces thereof, and each having an indicating bar on the front face thereof extending lengthwise of said columns the said columns being adapted to be folded lengthwise back to back and one of said columns torn off to regulate the length of the indicator bar thereof, of a holder for said strip unit comprising an open ended faced slide adapted to receive said strip unit in a manner whereby to exhibit the front face thereof, a transparent strip insertable into said holder for protecting the exhibiting face of said strip, and a supporting frame whereby a plurality of said holders may be supported in cooperative horizontal relation.

11. In a bar chart, the combination with a strip unit composed of two columns having horizontal divisions at like points on the front and back faces thereof, and each having an indicating bar on the front face thereof extending lengthwise of said columns, the said columns being adapted to be folded lengthwise back to back and one of said columns torn off to regulate the length of the indicator bar thereof, the said strip unit having applied thereupon a scale for indicating the place at which the portion of said unit is to be torn, of a holder for said strip unit comprising an open faced slide adapted to receive said strip unit in a manner whereby to exhibit the front face thereof, a transparent strip insertable into said holder for protecting the exhibiting face of said strip, and a supporting frame whereby a plurality of said holders may be supported in cooperative horizontal relation.

12. As a new article of manufacture, a master sheet from which bar chart exhibits are adapted to be made and upon which are applied vertical divisions for dividing the sheet into a plurality of columns, horizontal lines adjacent the top and bottom thereof for providing top and bottom blank spaces, other horizontal lines indicating a range of values, and indicating bars upon the columns and extending from top space to bottom space, and adapted when a portion of the column to which same is applied is torn off, to indicate values.

13. As a new article of manufacture, a master sheet from which bar chart exhibits are adapted to be made and upon the front and back faces of which are applied at identical positions vertical divisions adapted to divide the sheet into a plurality of like sized columns and at least one marginal column, horizontal lines adjacent the top and bottom thereof for providing top and bottom blank spaces, other main and supplemental horizontal lines extending wholly across the sheet and indicating a range of value, still other horizontal lines extending only across all except the marginal column and adapted to subdivide the value range indications, and on the columns other than the marginal column and only on one face thereof indicating bars extending centrally vertically of said columns from the top space to the bottom space and each adapted when a portion of the column to which same is applied is torn off, to indicate a value in accordance with the point on the value range at which it is torn.

14. As a new article of manufacture, a master sheet from which bar chart exhibits are adapted to be made and upon the front and back faces of which are applied at identical positions vertical divisions adapted to divide the sheet into a plurality of like sized columns and at least one marginal column, horizontal lines adjacent the top and bottom thereof for providing top and bottom blank spaces, other main and supplemental horizontal lines extending wholly across the sheet and indicating a range of value, and on the columns other than the marginal column and only on one face thereof indicating bars extending centrally vertically of said columns from the top space to the bottom space and each adapted, when a portion of the column to which same is applied is torn off, to indicate a value in accordance with the point on the value range at which it is torn.

15. As a new article of manufacture, a master sheet from which bar chart exhibits are adapted to be made and upon the front and back faces of which are printed at identical positions vertical divisions adapted to divide the sheet into twelve like sized columns and at least one marginal column, horizontal lines adjacent the top and bottom thereof for providing top and bottom blank spaces, other main and supplemental horizontal lines extending wholly across the sheet and indicating a range of value, and on the columns other than the marginal column and only on one face thereof indicating bars extending centrally vertically of said columns from the top space to the bottom space, each adapted, when a portion of the column to which same is applied is torn off, to indicate a value in accordance with the point on the value range at which it is torn, and all of said vertical lines being perforated to facilitate the tearing of the columns.

16. As a new article of manufacture, a master sheet from which bar chart exhibits are adapted to be made and upon which are applied vertical divisions for dividing the sheet into a plurality of columns, horizontal lines adjacent the top and bottom thereof for providing top and bottom blank spaces, other horizontal lines indicating a range of values, and vertically upon each column and extending from the top space to the bottom space, indicating bars adapted, when a portion of the column to which same is applied is torn off, to indicate values, all of said vertical lines being perforated to facilitate the tearing of the columns.

17. As a new article of manufacture, a master sheet from which bar chart exhibits are adapted to be made and upon the front and back faces of which are printed at identical positions vertical divisions adapted to divide the sheet into twelve like sized columns and at least one marginal column, horizontal lines adjacent the top and bottom thereof for providing top and bottom blank spaces, other main and supplemental horizontal lines extending wholly across the sheet and indicating a range of value, and on the columns other than the marginal column and only on one face thereof indicating bars extending centrally vertically of said columns from the top space to the bottom space, each adapted, when a portion of the column to which same is applied is torn off, to indicate a value in accordance with the point on the value range at which it is torn, and all of said vertical lines being perforated to facilitate the tearing of the columns, and having indicia printed on the marginal column indicating the scale of the range of values, and indicia printed in the alternate ones of the top spaces of the rear faces of the columns other than the margin and indicating to what the particular column relates.

18. As a new article of manufacture, a master sheet from which bar chart exhibits are adapted to be made and upon the front and back faces of which are printed at identical positions vertical divisions adapted to divide the sheet into twelve like sized columns and at least one marginal column, horizontal lines adjacent the top and bottom thereof for providing top and bottom blank spaces, other main and supplemental horizontal lines extending wholly across the sheet and indicating a range of value, and on the columns other than the marginal column and only on one face thereof indicating bars extending centrally vertically of said columns from the top space to the bottom space, each adapted, when a portion of the column to which same is applied is torn off, to indicate a value in accordance with the point on the value range at which it is torn, all of said vertical lines being perforated to facilitate the tearing of the columns, and having indicia printed on the marginal column indicating the scale of the range of values, indicia printed in the alternate ones of the top spaces of the rear faces of the columns other than the margin and indicating to what the particular column relates, and indicia on the remaining alternate column rear faces indicating the scale of the range of values and facilitating the tearing of the column.

19. A bar chart composed of two columns having horizontal divisions on one face and two indicating bars on the opposing face, said columns being adapted to be folded together with the horizontal divisions facing each other, means by which a part of one of said columns is adapted to be separated from the other column and the separated part detached from its column to leave the indicating bar of the remainder of the column from which the part is detached of the desired indicating length for the purposes described.

20. As a new article of manufacture, a master sheet from which bar chart exhibitions are adapted to be made, such sheet being divided into a series of vertical columns and horizontally ruled indicating lines and spaces across the columns, an indicating bar running longitudinally of each column, the indicating bars of all columns being of the same length, said sheet being adapted for separation of each column from the other for the purposes specified.

21. A master sheet for preparing bar charts comprising a blank divided into a series of vertical columns by lines along which said columns may be detached one from the other, said sheet having horizontally ruled lines and spaces extending across the same and having vertically ruled indicator bars, there being one bar for each column, and marginal columns with corresponding horizontally ruled lines and spaces for guide data to which the columns having the indicator bars are related, the said sheet being provided with vertical perforations between the several columns whereby each column may be separated from the other to provide individual strips for the purposes specified.

22. A bar chart comprising a series of strips divided into transverse indicating lines and spaces and having an indicating bar of a length depending upon the indication to be made, there being several strips assembled side by side with the transverse lines and spaces registering for the purposes specified.

23. In a bar chart, a strip unit composed of a plurality of columns having horizontal divisions at like points on the front and back faces thereof, said columns having indicating bars on the front face thereof extending lengthwise of the columns, said columns adapted to be folded over each other with the indicator bars exposed, at least one of said columns being adapted to be cut off to regulate the length of its indicator bar, substantially as shown and described.

24. In a bar chart, a strip unit composed of a plurality of columns having horizontal divisions at like points on the front and back faces thereof, said columns having indicating bars on the front face thereof extending lengthwise of the columns, said columns adapted to be folded over each other with the indicator bars exposed, at least one of said columns being adapted to be cut off to regulate the length of its indicator bar, said strip unit having applied thereon horizontal sub-dividing lines constituting a scale for indicating the place at which the portion of the unit is to be cut off.

WILLIAM J. STRATTON.